May 14, 1946.  L. W. COLE ET AL  2,400,223
ELECTRIC BUS BAR CONSTRUCTION
Filed March 26, 1943  2 Sheets-Sheet 2
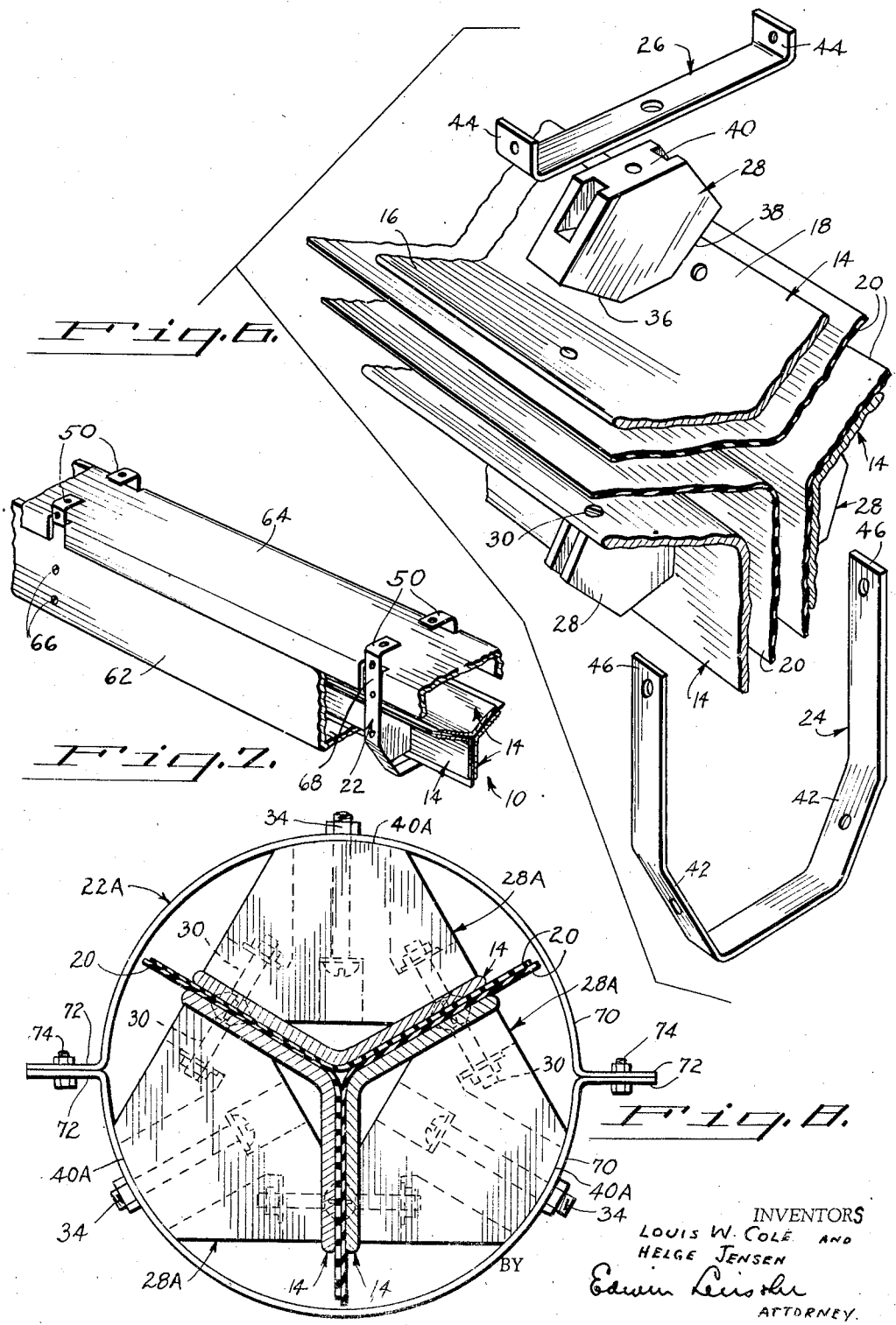
INVENTORS
LOUIS W. COLE AND
HELGE JENSEN
BY Edwin Leinster
ATTORNEY.

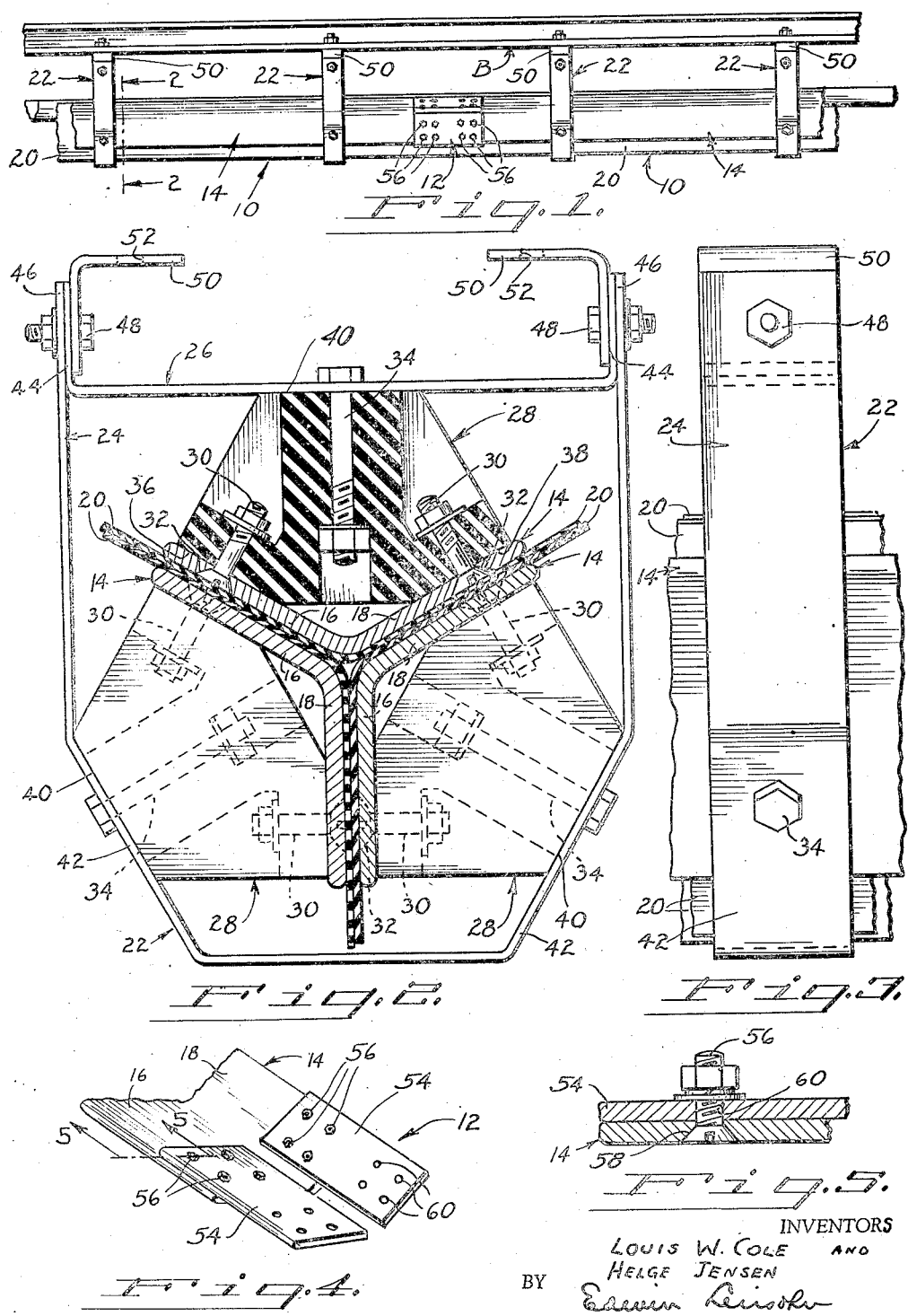

Patented May 14, 1946

2,400,223

UNITED STATES PATENT OFFICE 2,400,223

ELECTRIC BUS BAR CONSTRUCTION

Louis W. Cole, New York, and Helge Jensen, Flushing, N. Y., assignors to Cole Industries, Inc., Long Island City, N. Y., a corporation of New York Application March 26, 1943, Serial No. 480,636

5 Claims. (Cl. 174—99)

This invention relates to electric bus bars and more particularly to a three-phase bus bar assembly and construction.

One object of the present invention is the provision of means for securing the companion bus bars of a three-phase system in predetermined electrical and mechanical relation without requiring the use of a bus duct or casing, the construction and arrangement of the bus bars and the means for holding them in assembled relation being such as to enable the bus bar assembly to be manufactured and shipped as a unit ready for installation.

Another object is to provide a bus bar assembly which can be used with or without a casing or other enclosure.

A further object is generally to provide a multiphase bus bar assembly of improved construction.

The above and other objects and advantages of the invention will best be understood from the following description, reference being had to the accompanying illustrative drawings.

In the drawings:

Fig. 1 is a side view in elevation of a bus bar assembly embodying the present invention, illustrating the assembly in installed condition;

Fig. 2 is a transverse sectional view on the line 2—2 of Fig. 1, on a larger scale, one of the insulation blocks being shown in section and the others in elevation;

Fig. 3 is a fragmentary side view of the bus bar assembly;

Fig. 4 is a perspective view of an end portion of one of the bus bars and of means for securing one length of bus bar to an adjacent length of bus bar;

Fig. 5 is a detail sectional view on the line 5—5 of Fig. 4;

Fig. 6 is an exploded perspective view of the parts of the bus bar assembly;

Fig. 7 is a perspective view of a length of the bus bar assembly provided with an enclosure therefor;

Fig. 8 is a view similar to Fig. 2 showing another form of the invention.

Referring now to the drawings in detail, there is illustrated in Fig. 1 two adjacent end portions of two bus bar assembly units 10 electrically connected to each other as indicated at 12 and installed in a building ready for use, being supported as here more or less diagrammatically illustrated from an overhead beam B or other part of the factory building. One of the bus bar assembly units 10 will now be described.

The bus bar assembly 10 embodying the present invention comprises three bus bars 14, each of the same length which, of course, may vary, said bus bars being preferably made of copper. Each bus bar 14 is formed of flat metal stock bent to provide the angularly related integral portions 16 and 18 which extend longitudinally of the companion bus bar for the full length thereof. As illustrated in Fig. 2, the angle defined by the bus bar portions 16 and 18 is about 120°. In the assembled relation of the three bus bars 14 of the three phases, said bus bars are disposed as illustrated in Fig. 2 in Y configuration with one of the angularly related portions of the bus bar of each phase disposed in adjacent confronting face to face relation with one of the angularly related portions of the bus bar of a second phase and with the other angularly related portion of the bus bar of each phase in similar adjacent confronting face to face relation with an angularly related portion of the bus bar of a third phase. Said confronting portions, while adjacent to each other, are spaced and insulated from each other. Preferably, as here shown, flexible sheets 20 of insulation material are disposed in the spaces between the three bus bars 14. It will be understood that the bus bars of the three phases are thus disposed as close as possible to each other, while being insulated from each other, so that the impedance of the system is low.

The three bus bars 14 are held in the above described relation by a plurality of holding devices 22 disposed in spaced relation logitudinally of the bus bar assembly unit. Each holding device 22 comprises metal straps 24 and 26 and three rigid insulation blocks 28 formed of porcelain or other suitable insulation material. Each block 28 is rigidly secured to a companion bus bar 14 and more particularly to the angularly related portions 16 and 18 thereof by means of bolts 30, the heads of which are received in countersunk openings 32 formed in the companion bus bars so that the heads of said bolts lie substantially flush with the surface of the companion bus bar portions. Strap 24 is rigidly secured to two of the insulation blocks 28 by means of companion bolts 34, and strap 26 is similarly secured to the third insulation block 28 by a bolt 34. It will be understood that blocks 28 of each holding device 22 are interchangeable. It will be noted that each insulation block 28 is provided with angularly related flat portions 36 and 38 which abut the angularly related portions 16 and 18, respectively, of the companion bus bar, having the same angular relation as said bus bar portions of the companion bus bar. Also, each insulation block 28 has a flat end portion 40, said end portions 40 of two of the insulation blocks 28 abutting the angularly related portions 42 of strap 24, and the end portion 40 of the third insulation block 28 abutting the strap 26. Strap 26 is provided with bent end portions 44 which are rigidly secured to the adjacent end portions 46, respectively, of strap 24 in any suitable way as by bolts 48. Also as here shown, brackets 50 are secured to each holding device 22, preferably by the bolts 48 which secure the ends of strap 26 to the adjacent ends of strap 24. Brackets 50 are provided with holes 52 for bolts by means of which the holding devices 22 can be secured to a beam or other part of the building for supporting the bus bar assembly in its installed condition.

It will be understood that in actual practice a plurality of the bus bar assemblies are electrically connected to each other to form the necessary bus bar length, the connection between two bus bar assembly units being indicated at 12 as hereinbefore stated with reference to Fig. 1 of the drawings. The connection 12 comprises two copper or other metal plates 54 for each bus bar 14, said two plates 54 having the same current carrying capacity as the bus bar to which they are secured. Plates 54 are secured to the angularly related portions 16 and 18 of the companion bus bar in any suitable way as by bolts 56, the outer ends of the bus bars having countersunk holes 58 for the heads of said bolts and said plates being provided with holes 60 to receive said bolts. Thus, the necessary length of bus bars can be produced by connecting a plurality of units 10 by means of the coupling plates 54, there being three sets of plates for two bus bar units. While the length of each unit may vary, the units are preferably of a standardized length of ten feet in which case the length of each bus bar 14 of the unit 10 is ten feet. The holding devices 22 not only secure the bus bars 14 of the unit 10 in predetermined electrical and mechanical relation, but also constitute means for supporting the unit in position.

It will be observed that the bus bar assembly, as illustrated in Fig. 1, is not enclosed in a casing or other enclosure and that the bus bars are accordingly exposed to the ambient atmosphere for the radiation of heat which may be generated in the bus bars by the passage of the current therein. However, if desired, the bus bar assembly units may be enclosed. Thus, as illustrated in Fig. 7, the bus bar assembly unit 10 is shown provided with an enclosure formed of the U-shaped member or duct 62 provided with a removable cover 64. Said duct 62 can be secured to the bus bar assembly unit 10 in any suitable way, for example, by means of screws 66 which fasten duct 62 to the side portions 68 of straps 22. The enclosure can be formed of any suitable material, for example, light sheet metal, expanded metal, etc., or said enclosure can be formed in whole or in part of sheet insulation material. It will be understood that when the enclosure is formed of expanded metal, the bus bar assembly is open to the cooling action of the ambient atmosphere while, at the same time, the enclosure provides a guard for the bus bars.

In the form of the invention illustrated in Fig. 8, the bus bar assembly is substantially the same as that described above except that the holding device is of a somewhat different construction. More particularly, as here shown, the holding device 22A comprises two semi-circular straps 70 having outwardly turned flanged portions 72 which may be secured to each other in any suitable way as by bolts 74. The insulation blocks 28A are of substantially the same construction as the insulation blocks 28 and are secured to the companion bus bars 14 in the same way, but as here shown, the surface portions 40A of the insulation blocks 28A, instead of being flat as are the surface portions 40 of the insulation blocks 28, are curved to conform to the curvature of the adjacent portions of straps 70.

It will be understood that various changes may be made in the construction herein shown or described without departing from the principles of this invention. Accordingly, we do not wish to be limited to the invention as herein illustrated or described except to the extent which may be required by the scope of the appended claims.

Having thus described our invention, what we claim and desire to secure by Letters Patent is:

1. A three-phase bus bar assembly unit comprising three bus bars, each of said bars having longitudinally extending integral angularly related flat portions, said three bus bars in assembled relation being disposed in Y configuration, and a plurality of holding devices disposed in spaced relation longitudinally of the three bus bars for securing them in said assembled relation in said Y configuration, each of said holding devices comprising a plurality of rigid insulation blocks secured individually and directly to said bus bars, respectively, each of said blocks having an inner end thereof provided with angularly related flat surface portions in abutting relation to said angularly related flat portions of the companion bus bar, and means interconnecting said blocks for securing them in fixed relation with respect to each other.

2. A three-phase bus bar assembly unit comprising three bus bars, each of said bars having longitudinally extending angularly related flat portions, said three bus bars in assembled relation being disposed in Y configuration, and a plurality of holding devices disposed in spaced relation longitudinally of the three bus bars for securing them in said assembled relation in said Y configuration, each of said holding devices comprising a plurality of rigid insulation blocks secured individually directly to said bus bars, respectively, each of said blocks having an inner end thereof provided with angularly related flat surface portions in abutting relation to said angularly related flat portions of the companion bus bar, and means interconnecting said blocks for securing them in fixed relation with respect to each other, said interconnecting means comprising a U-shaped strap secured to two of said blocks and a strap secured to the third block and having bent end portions secured to adjacent end portions, respectively, of said U-shaped strap, said end portions of said U-shaped strap being in spaced confronting relation and said end portions of the other strap being secured to the confronting surfaces, respectively, of said end portions of said U-shaped strap.

3. A three-phase bus bar assembly unit comprising three bus bars, each of said bars having longitudinally extending angularly related flat portions, said three bus bars in assembled relation being disposed in Y configuration, a plurality of rigid insulation blocks secured to each of said bus bars, said blocks being spaced longitudinally of the companion bus bar and being disposed in the angle between the angularly related portions thereof each of said blocks having an inner end thereof provided with angularly related flat surface portions in abutting relation to said angularly related flat portions of the companion bus bar, the blocks which are secured to one of said bus bars being in alignment, transversely of the bus bars, with the blocks which are secured to the other two bus bars, and means secured to the aligned blocks of the three bus bars for holding them in fixed relation with respect to each other, said last mentioned means comprising a strap secured to two of the alinged insulation blocks and a strap secured to said first mentioned strap and to the third aligned insulation block, said two straps being curved and forming a circumferentially continuous member, the ends of each of said straps being out-turned and secured to the out-turned ends of the companion strap.

4. A three-phase bus bar construction comprising three bus bars, one for each phase, each of said bus bars having longitudinally extending angularly related flat portions, the three bars being assembled in Y configuration, with one of the angularly related portions of the bus bar of each phase disposed in confronting face to face relation with one of the angularly related portions of the bus bar of a second phase and with the other angularly related portions of the bus bar of each phase in confronting face to face relation with an angularly related portion of the bus bar of a third phase, said confronting portions being close to but insulated from each other, a plurality of rigid insulation blocks disposed in the space between said angularly related portions of each of said bus bars, respectively, each of said blocks having an inner end thereof provided with angularly related flat surface portions in abutting relation to said angularly related flat portions of the companion bus bar, said blocks in each of said spaces being spaced from each other longitudinally of the companion bus bar and secured thereto, said blocks extending outwardly from said space beyond the edges of the companion bus bar and the blocks of the three bus bars being in alignment transversely of the three bus bars, and means positioned around the outer edges of the three bus bars in spaced relation thereto and secured to said aligned blocks for holding said bus bars in said assembled relation.

5. A three-phase bus bar construction comprising three bus bars, one for each phase, each of said bus bars having longitudinally extending angularly related flat portions, the three bars being assembled in Y configuration, with one of the angularly related portions of the bus bar of each phase disposed in confronting face to face relation with one of the angularly related portions of the bus bar of a second phase and with the other angularly related portions of the bus bar of each phase in confronting face to face relation with an angularly related portion of the bus bar of a third phase, said confronting portions being close to but insulated from each other, a plurality of rigid insulation blocks disposed in the space between said angularly related portions of each of said bus bars, respectively, each of said blocks having an inner end thereof provided with angularly related flat surface portions in abutting relation to said angularly related flat portions of the companion bus bar, said blocks in each of said spaces being spaced from each other longitudinally of the companion bus bar and secured thereto, and means positioned around the outer edges of the three bus bars in spaced relation thereto and secured to said aligned blocks for holding said bus bars in said assembled relation.

LOUIS W. COLE.
HELGE JENSEN.